H. B. MASSER.
Coffee Roaster.
No. 56,964.                                Patented Aug. 7, 1866.
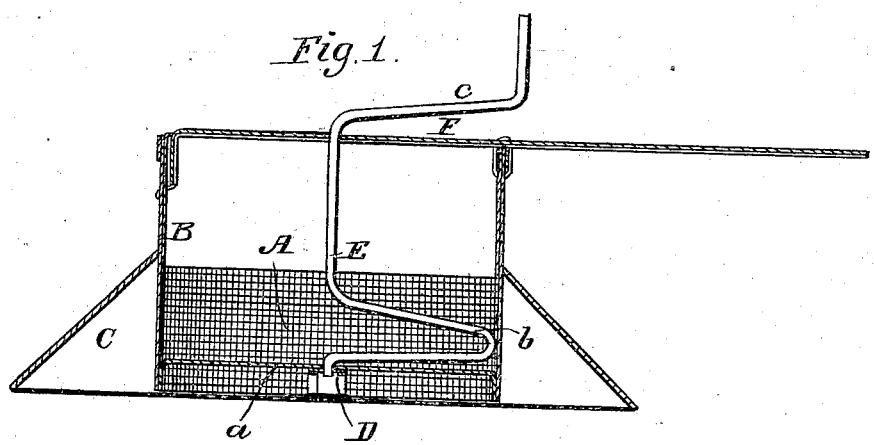
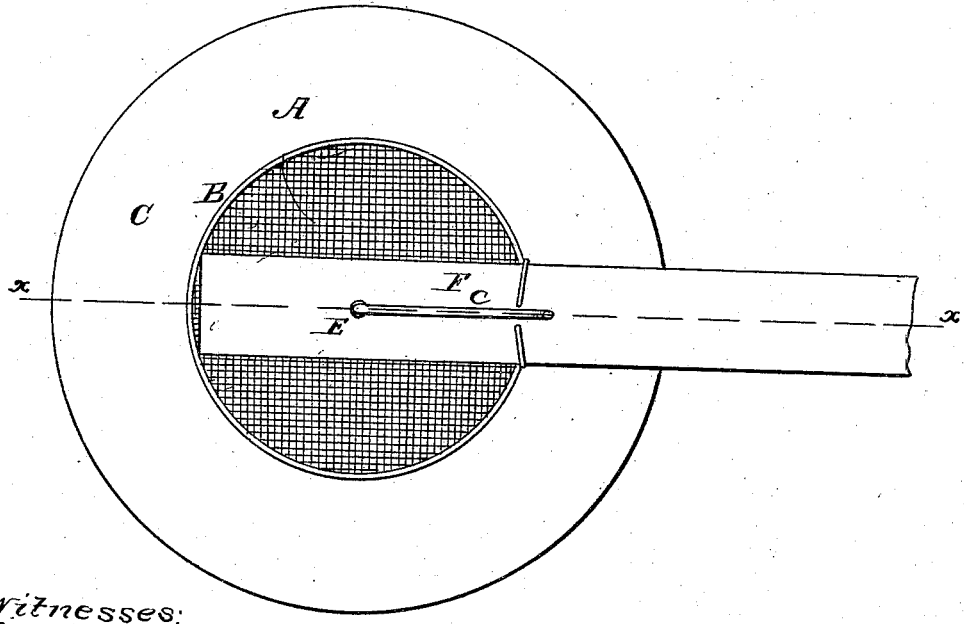

UNITED STATES PATENT OFFICE.

H. B. MASSER, OF SUNBURY, PENNSYLVANIA.

COFFEE-ROASTER.

Specification forming part of Letters Patent No. 56,964, dated August 7, 1866.

*To all whom it may concern:*

Be it known that I, H. B. MASSER, of Sunbury, in the county of Northumberland and State of Pennsylvania, have invented a new and Improved Coffee-Roaster; and I do hereby declare that the following is a full, clear, and exact description thereof, which will enable others skilled in the art to make and use the same, reference being had to the accompanying drawings, forming part of this specification, in which—

Figure 1 is a vertical central section of my invention taken in the line $x\ x$, Fig. 2; Fig. 2, a plan or top view of the same.

Similar letters of reference indicate like parts.

The object of the invention is to obtain a simple, portable, and economical device for roasting coffee, one which may be manipulated with the greatest facility, both as regards the stirring of the coffee while being roasted and the removal of the same, when roasted, from the device.

The invention consists in having a chamber or coffee-receptacle of wire-cloth, with a conical flange around it to serve as a heat retainer or deflector, a handle being attached to the upper part of the coffee-receptacle, and the latter provided with a rotary stirrer, all being constructed and arranged as hereinafter described, whereby the device may be readily applied to a stove or be used in connection with a lamp, and the coffee roasted expeditiously and in a perfect manner.

A represents a coffee-receptacle, constructed of wire-cloth and of cylindrical form, with the bottom $a$ a trifle above the lower end of the receptacle, as shown in Fig. 1. In the upper part of this receptacle there is fitted a sheet-metal cylinder, B, in order to render it stiff or firm, and the lower part of said receptacle, below the cylinder B, is encompassed by a conical flange, C, which extends down a trifle below the lower end of the receptacle A.

In the lower part of the receptacle A, below the bottom $a$, there is secured a bar, D, at the center of which is stepped the lower end of a shaft, E, which is bent near its lower end to form a crank-shaped projection or arm, $b$, which extends nearly to the inner surface of the receptacle A, the shaft extending up through a bar, F, which is attached to the upper edge of the cylinder B and projects beyond it a suitable distance to serve as a handle.

The upper end of the shaft E is bent to form a crank, $c$, for the purpose of turning it. A wire of suitable thickness may be used for the shaft E, as it may be readily bent to form the arm and crank.

The coffee is placed in the receptacle A and placed on a stove, and the coffee stirred by turning the shaft E, the arm or projection $b$ effecting that result.

The coffee may be roasted uniformly throughout and to the proper degree, as it may be clearly seen, by the operation.

If desired, the device may be used with a lamp; but it will probably be most generally used on a stove.

When the coffee is roasted it is discharged from the receptacle by simply inverting the device over a bowl or other vessel by giving the handle a turn, which is the work of a moment.

Having thus described my invention, I claim as new and desire to secure by Letters Patent—

A coffee-roaster composed of a wire-cloth receptacle with a flange fitted upon it and provided with a stirrer and handle, substantially as shown and described.

H. B. MASSER.

Witnesses:
WM. F. MCNAMARA,
ALEX. F. ROBERTS.